United States Patent
Jack

(10) Patent No.: US 7,005,094 B2
(45) Date of Patent: Feb. 28, 2006

(54) METHOD AND SYSTEMS FOR IN-MOLD LABELING OF IRREGULARLY SHAPED PRODUCTS

(76) Inventor: Neil C. Jack, 647 Stonewall Rd., East Chatham, NY (US) 12060

( * ) Notice: Subject to any disclaimer, the term of this patent is extended or adjusted under 35 U.S.C. 154(b) by 313 days.

(21) Appl. No.: 10/287,747

(22) Filed: Nov. 4, 2002

(65) Prior Publication Data

US 2004/0083918 A1  May 6, 2004

(51) Int. Cl.
- B29C 59/00 (2006.01)
- C04B 41/00 (2006.01)
- B32B 18/00 (2006.01)
- B28B 3/06 (2006.01)

(52) U.S. Cl. .................. 264/129; 264/132; 264/134; 264/135; 264/239; 264/259; 264/297.2

(58) Field of Classification Search .......... 264/297.2, 264/259, 239, 135, 134, 132, 129
See application file for complete search history.

(56) References Cited

U.S. PATENT DOCUMENTS

| | | | |
|---|---|---|---|
| 4,729,864 A | 3/1988 | Chang et al. | 264/509 |
| 4,802,295 A | 2/1989 | Darr | 40/310 |
| 5,104,306 A | 4/1992 | Gordon et al. | 425/503 |
| 5,238,630 A * | 8/1993 | Tung | 264/132 |
| 5,851,479 A | 12/1998 | McGlynn et al. | 264/526 |
| 5,919,498 A | 7/1999 | Weber et al. | 425/503 |
| 5,968,443 A * | 10/1999 | Robles et al. | 264/509 |
| 6,116,888 A | 9/2000 | Johnston et al. | 425/195 |
| 6,193,925 B1 | 2/2001 | Weber et al. | 264/509 |
| 6,217,013 B1 | 4/2001 | Foreman | 269/21 |
| 6,223,945 B1 | 5/2001 | Giblin et al. | 222/109 |
| RE37,248 E * | 6/2001 | Dudley | 428/220 |
| 6,444,301 B1 * | 9/2002 | Davidson et al. | 428/315.5 |
| 6,544,634 B1 | 4/2003 | Abrams et al. | 428/212 |
| 2002/0100387 A1 | 8/2002 | Churchwell | 101/488 |
| 2003/0173717 A1 | 9/2003 | Abrams et al. | 264/496 |

FOREIGN PATENT DOCUMENTS

| | | |
|---|---|---|
| EP | 0534185 A1 | 3/1993 |
| GB | 984250 | 2/1965 |

OTHER PUBLICATIONS

Menges, Michaeli, Mohren, *"How to Make Injection Molds"*, Hanser Publishers, p. 54, paragraph 2-3, 2001.

* cited by examiner

*Primary Examiner*—Stephen J. Lechert, Jr.
(74) *Attorney, Agent, or Firm*—Heslin Rothenberg Farley & Mesiti, P.C.; Victor A. Cardona, Esq.

(57) ABSTRACT

The present invention provides a method for use in forming an irregularly shaped part using in-mold labeling which includes receiving at least one of text and image information at a first computing unit. A mold is formed using a mold cutter controlled by a second computing unit based on the at least one of text information and image information. The mold has a cavity, an interior surface, and at least one aligning characteristic on the interior surface. A label is printed based on the at least one of text information and image information to provide the at least one decoration. The label is cut from a sheet of paper using a label cutter controlled by a third computing unit based on the at least one of text information and image information. The label is inserted into the cavity and aligned with the at least one aligning characteristic and moldable material is inserted into the mold to form the part and the label integral to each other.

18 Claims, 7 Drawing Sheets

FIG. 2
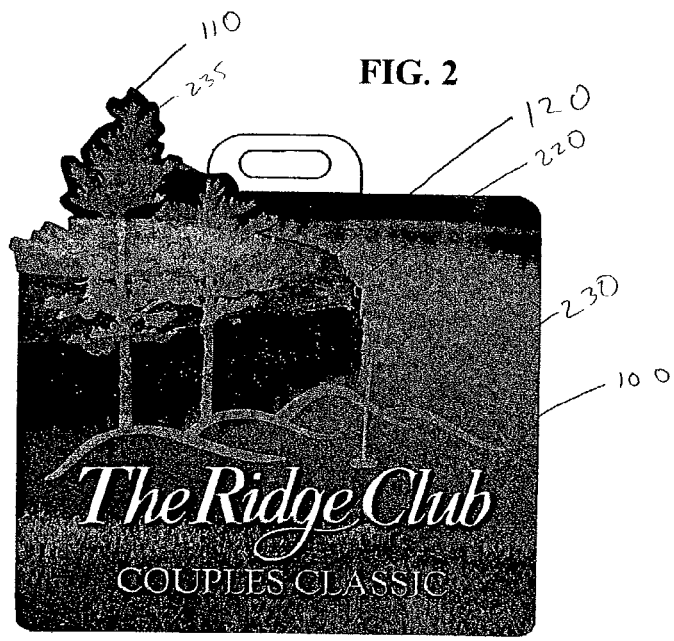
FIG. 3
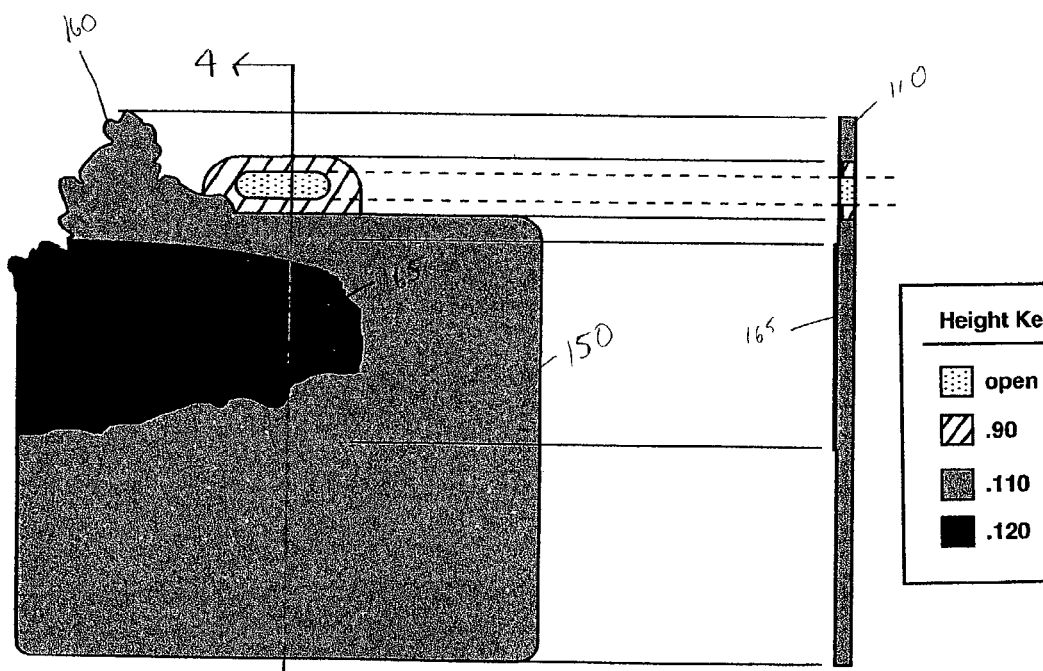
FIG. 4

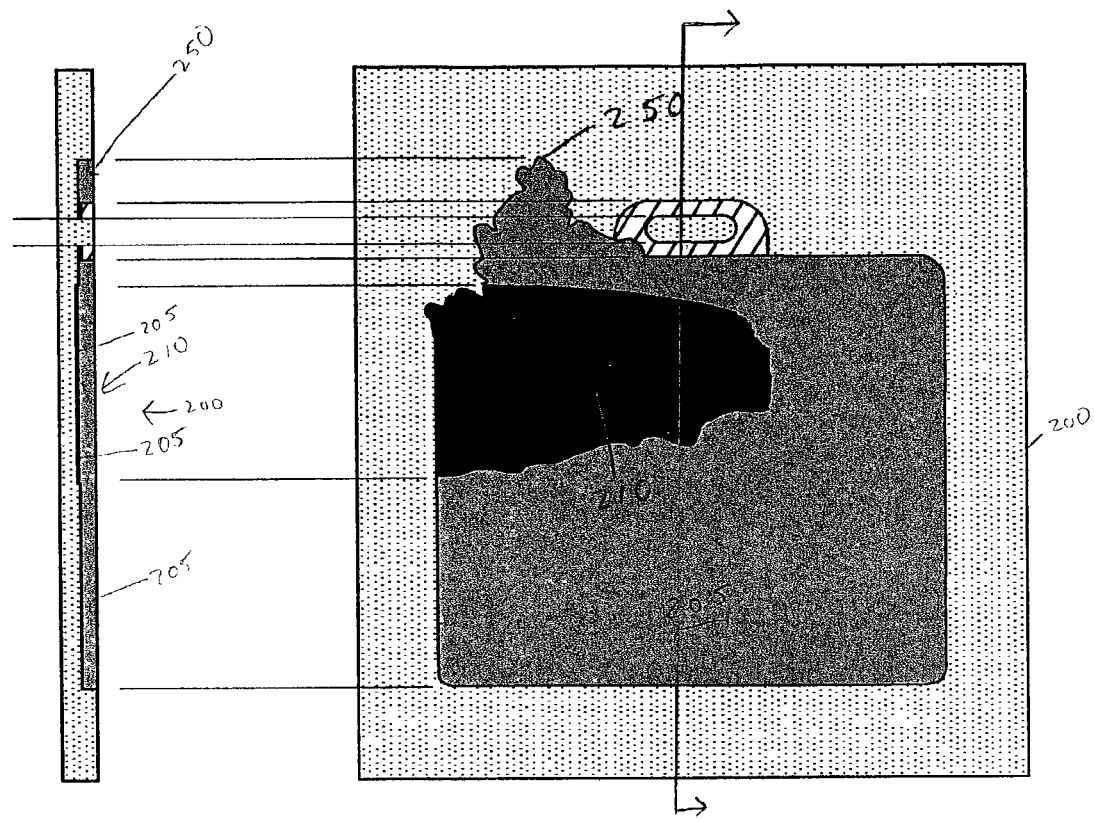
FIG. 6          FIG. 5
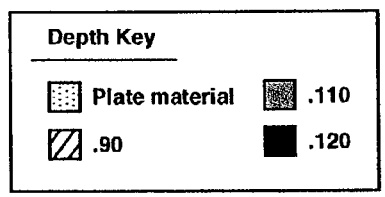

FIG. 8
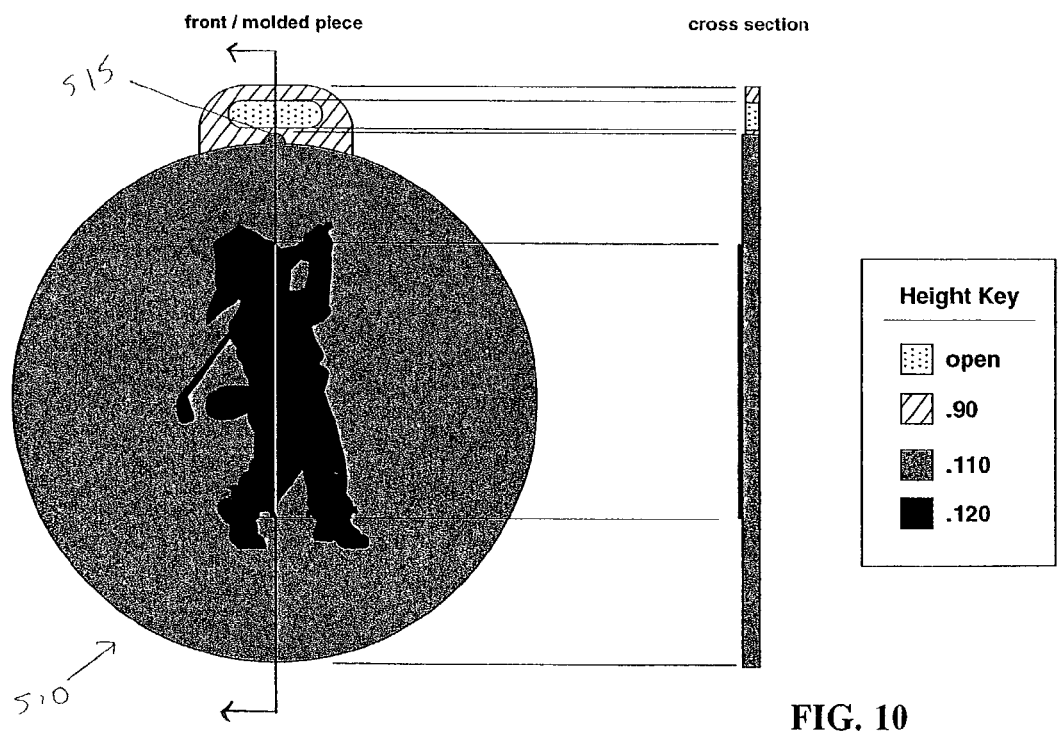
FIG. 9  FIG. 10

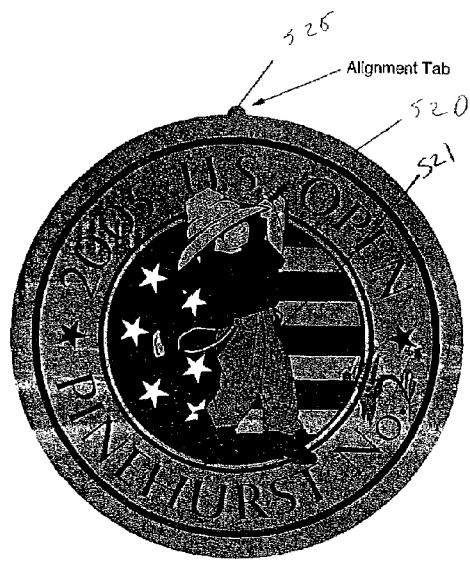
FIG. 11  Die-Cut Label
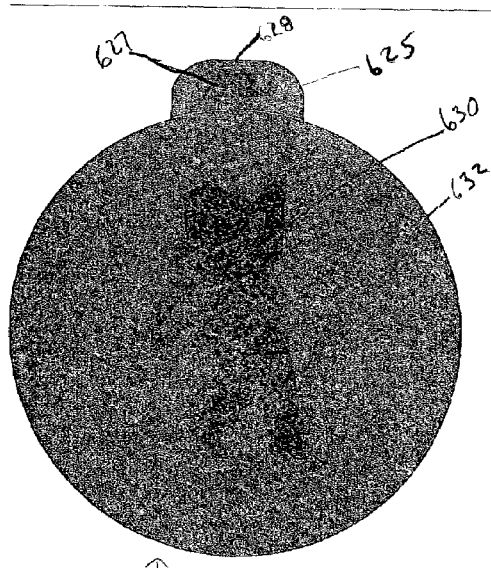
Tool Path for Mold Tool
FIG. 13
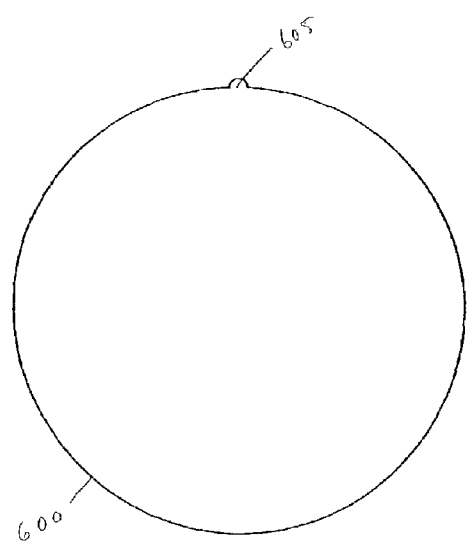
FIG. 12  Die Cut Line For Label Cutting

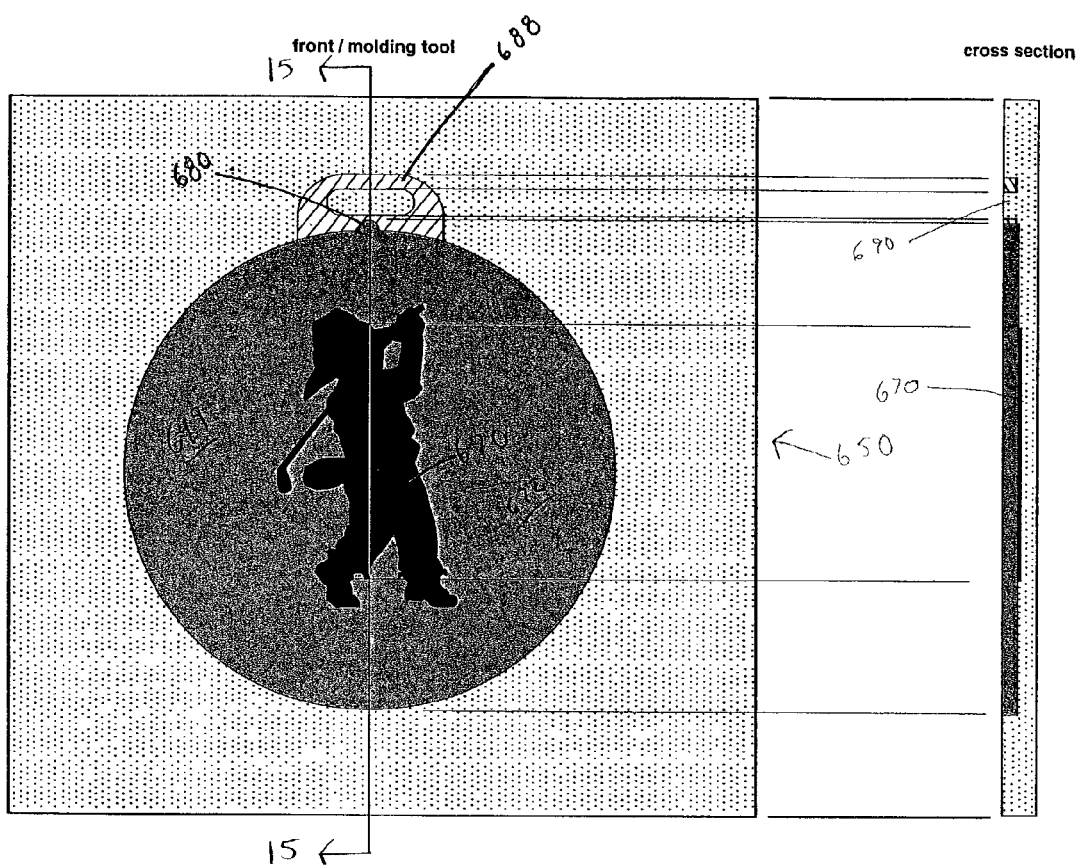
FIG. 14  FIG. 15

METHOD AND SYSTEMS FOR IN-MOLD LABELING OF IRREGULARLY SHAPED PRODUCTS

TECHNICAL FIELD

This invention relates, in general to injection molding and in particular to in-mold labeling of irregularly shaped injection molded products.

BACKGROUND ART

In-mold labeling is a process whereby a label and moldable material are inserted into a mold to form an integral label and molded product combination. Such a combination results in a product having the label attached thereto which is resistant to being separated from the product. Thus, any desired images, instructive text, or other decoration remains with the product.

Products formed by blow molding utilizing in-mold labeling include regularly shaped objects such as food containers, for example, butter or margarine containers. Examples of injection molded products using in-mold labeling include long runs of automotive parts and cell phones. However, irregularly shaped objects have not been commonly formed using in-mold labeling due to difficulties in aligning labels with the irregular properties of such objects, such as irregular perimeters, surface recesses, or projections. Such matching or corresponding between labels and molded objects is known to those skilled in the art as registration.

Thus, there is a need for methods and systems for forming irregularly shaped objects utilizing in-mold labeling.

SUMMARY OF THE INVENTION

The present invention provides, in a first aspect, a method for use in in-mold labeling to form an irregularly shaped part. The method includes receiving at least one of text information and image information at a first computing unit and forming a mold using a mold cutter controlled by a second computing unit based on the at least one of text information and image information. The mold has a cavity, an interior surface, and at least one aligning characteristic on the interior surface. The method further includes printing a label based on the at least one of text information and image information to provide the at least one decoration. Also included is cutting the label from a sheet of paper using a label cutter controlled by a third computing unit based on the at least one of text information and image information. Further, a label is inserted into the cavity and aligned with the at least one aligning characteristic. Moldable material is inserted into the mold to form the part and the label integral to each other.

The present invention provides, in a second aspect, a system for use in forming an irregularly shaped part using in-mold labeling which system includes a first computing unit, a second computing unit, a third computing unit, a mold cutter, a label cutter and an injection molder. The first computing unit is adapted to receive at least one of text information and image information and adapted to cause a label to be printed based on the at least one of text information and image information. The mold cutter is coupled to the second computing unit and controllable thereby to cut a mold based on the at least one of text information and image information. The label cutter is coupled to the third computing unit and adapted to cut a label based on the at least one of text information and image information. Also, the injection molder is adapted to insert moldable material into the mold. Further, the mold cutter is adapted to cut a characteristic of the mold to a first shape and the label cutter is adapted to cut the label to a second shape, with at least a portion of the first shape and at least a portion of the second shape substantially corresponding to each other.

The present invention provides, in a third aspect, a system for use in forming an irregularly shaped part using in-mold labeling. The system includes a computer controllable printer, a computer controllable label cutter, and a computer controllable mold cutter. Further included is computer means for controlling the printer, the label cutter, and the mold cutter, using a single set of data, to produce a mold and printed label which substantially correspond to each other.

The present invention provides, in a fourth aspect, a method for use in forming an irregularly shaped part using in-mold labeling which includes providing a computer controllable printer, a computer controllable label cutter, and a computer controllable mold cutter. Further included is a step for using at least one computer to control the printer, the label cutter, and the mold cutter to produce the mold and the printed label using a single set of data. The mold and the label substantially correspond to each other.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

FIG. 2 is a front elevational view of a golf bag tag formed using the system of FIG. 1;

FIG. 3 is a front elevational view of a molded part portion of the golf bag tag of FIG. 2, i.e., the golf bag tag with the label removed;

FIG. 4 is a cross-sectional view of the molded part portion of FIG. 3 taken along line 4—4 and looking in the direction indicated;

FIG. 5 is a front elevational view of a mold used to form the golf bag tag of FIG. 2;

FIG. 6 is a cross-sectional view of the mold of FIG. 5 taken on line 6—6 and looking in the direction indicated;

FIG. 8 is a front elevational view of a second golf bag tag, formed in accordance with the systems and methods of the present invention;

FIG. 9 is a front elevational view of a molded part portion of the golf bag tag of FIG. 8, i.e., the golf bag tag with the label removed;

FIG. 10 is a cross-sectional view of the molded part of FIG. 9 taken along line 10—10 and looking into the direction indicated;

FIG. 11 is a front elevational view of the label portion of the golf bag tag of FIG. 8;

FIG. 12 is an illustration of a die cut line usable for creating the label of FIG. 11;

FIG. 13 is an illustration of a tool path for producing a mold usable for producing the molded part of FIG. 9;

FIG. 14 is a top elevational view of a mold for producing the golf bag tag of FIG. 8; and FIG. 15 is a cross-sectional view of the mold of FIG. 14 taken along line 15—15 and looking in the direction indicated.

DETAILED DESCRIPTION

In accordance with the principles of the present invention, methods and systems are provided for forming parts using in-mold labeling. One method includes receiving text and/or image information at a computing unit and forming a mold having at least one aligning characteristic by using a mold cutter controlled by the computing unit based on the text and/or image information. A label is printed based on the text and/or image information to provide the at least one decoration. The label is cut to conform to the shape of the mold based on the text and/or image information. Further, the label is inserted into the cavity and aligned with the at least one aligning characteristic and moldable material is inserted into the mold to form the part and the label integral to each other.

Figure 1:
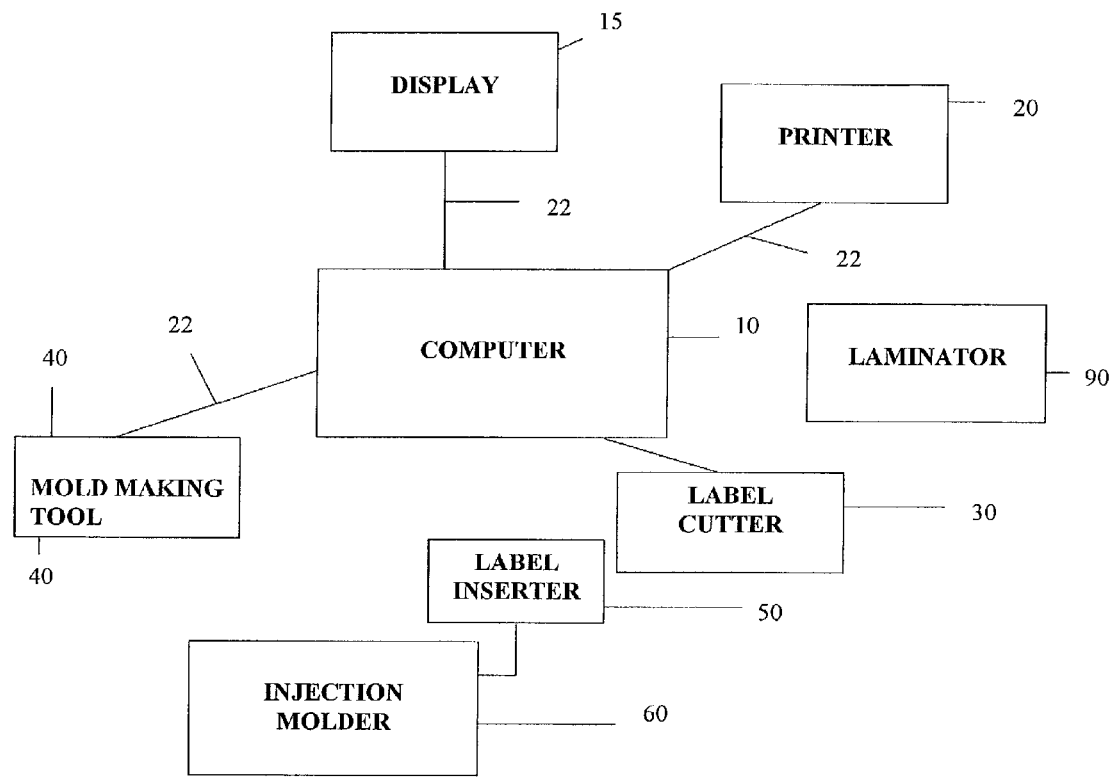
FIG. 1 is a block diagram of a system for forming a molded part having at least one decoration, in accordance with the present invention.

In an exemplary embodiment depicted in FIG. 1, a computing unit 10 is coupled to a printer 20, a label cutter 30, and a mold making tool 40.

Computing unit 10 may be a processor or computing unit, for example, an IBM mainframe or server, a Hewlett Packard system running HP-UX, a Unix derivative Operating System, a personal computer, such as a personal computer with Microsoft WINDOWS as the operating system and based on the Intel PC architecture, or an Apple Macintosh System. Computing unit 10 includes, for example, one or more central processing units, memory, one or more storage devices and one or more input/output devices, as is well known in the art. For example, computing unit 10 may have a display 15 to enable visual output for viewing by a user.

Computing unit 10 may be coupled to printer 20, label cutter 30, and/or mold making tool 40 via a standard connection 22, such as any type of wire connection, token ring or network connection, to name just a few examples. One example of a communications protocol used by one or more of these connections is TCP/IP which allows connection to a computer network, such as, for example, a local area network or a global computer network (e.g., the INTERNET).

Computing unit 10 may receive or obtain an electronic file of an image desired to be transferred to a label, for example a digital image file in PDF format. The image file may be input by a user, and may result from a digital photograph, from a scanned photograph, transparency or other image, or from other means for creating such an image file, for example. Such electronic files may be in one of various electronic forms, including, for example, JPEG, AI, EPS, TIFF, PDF, PICT, PSD, GIFF, or any other standard graphic or picture file.

Computing unit 10 and/or software adapted to run thereon may be adapted to create an image print file, a die cut file, and a mold cut file based on the image file. These files may be created and/or manipulated utilizing ADOBE ILLUSTRATOR and ADOBE PHOTOSHOP, for example. ADOBE ILLUSTRATOR may be utilized to create the mold cut file including a tool path to cut a mold cavity and a die cut file including a die cut path for cutting the labels. Other suitable software programs include COREL DRAW and ALDUS FREEHAND, for example. In another example, computing unit 10 may create a composite file which includes the image print file, the die cut file, and the mold cut file. From this composite file, the component files may be created and saved on a storage device. Computing unit 10 may also be adapted to receive other image and/or text information including, for example, a desired outer perimeter shape of the label and/or part to be molded. Such information may further include a desired profile of the label and/or part including recesses or embossed portions thereof. Some or all of this information may also be combined into the image print file, die cut file, and/or mold cut file.

The image print file may be suitable to be printed by printer 20 on a label or the originally submitted image file may be printed directly on such a label. The image print file may include an arranging of the labels on sheet to be printed, known in the art as "tiling", to allow the maximum number of labels to be printed on a single sheet. Such tiling may be performed using ADOBE ILLUSTRATOR and the labels may be separated by about 0.1 inches on the sheet of labels, for example. The image print file may also include one or more target marks (e.g., 3), which are spaced at specified distances around the labels on the sheet to be printed. The target marks are utilized by label cutter 30 to ensure proper cutting of the labels. Printer 20 may be a digital printer adapted to print photo-quality images on labels. For example, printer 20 may be adapted to print on synthetic paper such as TESLIN® SPID or waterproof TESLIN® manufactured by PPG Industries of Barberton, Ohio. Printer 20 could be a laser or ink jet printer, for example, a Xerox digital printer model number 7700.

Label cutter 30 may be adapted to receive the die cut file created by computing unit 10 from the image file. The die cut path of the die cut file indicates to label cutter 30 the desired outline of the label to applied to the molded part. Label cutter 30 based on the die cut file may cut a label from a sheet of paper, e.g., synthetic paper, which may include one or more labels with the shape of such cut being known in the art as a die cut. Label cutter 30 may include a blade adapted to rotate 360 degrees to enable precise cuts and may be known to those skilled in the art as a plotter. One such label cutter is manufactured by Graphtec, having Model No. Cutting Pro FC4200-60. Other plotter/cutters which may be used are manufactured by Aeronaut Maxis, Rowland D. G., and Carlson, for example. Specifically, computing unit 10 and/or label cutter 30 may be adapted to create and store information for a die cut line in the die cut file to allow label cutter 30 to cut the label from the sheet of paper along the die cut line. Label cutter 30 may also automatically adjust for paper/print alignment and correct for printing/lamination shrinkage or stretch on the printed label through the use of an optical sensor, for example. Specifically, such adjustment is done utilizing the target marks printed on the sheet of labels by the printer 20. The image print file contains information specifying the distances between the target marks themselves and/or between the target marks and labels on the page. Label cutter 30 (e.g., the optical sensor thereof) is configured to locate these target marks in relation to each other and the labels. From such relationship on the actual printed page, label cutter 30 may determine if the printed page of labels has shrunk or stretched based on the specifications contained in the image print file. Label cutter 30 may then adjust its cutting of the labels based thereon. Such adjustment allows for label cutter 30 to make an accurate cut along an outer perimeter of the label while minimizing errors due to such shrinkage or stretch. In particular, the optical sensor allows label cutter 30 to compensate for the shrinking and/or stretch of the label based on the target marks to ensure that the actual die cut substantially conforms to a shape of the outer perimeter of the label(s).

Label cutter 30 may also be configured to cause any interior cuts of the label to be cut (i.e., openings or holes in the labels) prior to label cutter 30 cutting the outer perimeter of each label. This inhibits movement of the labels during the cutting of any interior portions thereof. Label cutter 30 could also include a laser cutter for cutting the shape(s) of the label(s).

The mold cut file may be utilized by computing unit 10 and/or mold making tool 40 to create a mold. Specifically, the tool path of the mold cut file indicates to the mold cut tool the outline of the part to be formed along with the depth and other various irregularities, profiles, and other features of the desired part and thus the desired mold. For example, mold making tool 40 may be controlled by computing unit 10 to cut a mold cavity in a piece of metal based on the tool path. The metal may be aluminum, steel, or another metal usable for injection molding. The cavity may include one or more aligning characteristics or irregular features on an interior surface of the mold. Such features or characteristics may be included in the mold cut file and die cut file which are used to create the mold and to cut the label, respectively. Because the mold and the label are created utilizing the same electronic (e.g. digital) file(s), the features thereof may correspond substantially identically. Thus, the label may be inserted into the cavity of the mold and it may be aligned with certain aligning characteristics of the mold prior to moldable material being inserted into the cavity. For example, the characteristics could include irregular shapes of the products to be formed by the molding process and a label may be aligned, corresponded, or matched substantially identically to such shapes. For example, the text or image on the label may correspond to, or match, such characteristics. Further, the mold characteristics could include recesses, receptacles, or projections on the interior surface of the mold which may cause projections or recesses in the part to be formed. Moreover, an aligning characteristic could be a tab or other feature unnecessary to the design of a label or mold created solely to allow the alignment of the mold and the label. Accordingly, because the labels and molds are formed utilizing the same electronic files, the label may be aligned with such recesses, projections, or other aligning characteristics such that they substantially correspond or match to one another. Further, the die cut line for the label and the outside perimeter of the mold cavity may match substantially identically. Such correspondence or matching between the label and the molded part is known in the art as registration. One example of a mold making tool 40 may be a computerized engraving machine manufactured by Meistergram.

Further, the molds produced by mold making tool 40 may include tab gates or fan gates, as is known by those skilled in the art. Such gates allow moldable material to be injected such that it flows therethrough over a back surface of the label thereby pinning the label in place at the beginning of a molding cycle. Further, these gates promote a smooth transition from the gate into the cavity, thus distributing the pressure. Accordingly, less concentrated pressure is applied to the label thereby inhibiting movement thereof during the injection process. The size of the tab or fan gate is dependent upon the amount of moldable material (e.g., plastic) which is needed to fill the finished part in the mold, i.e., the larger the part, the larger the tab or fan gate must be. For example, the minimum size of such a gate is 0.015 inches in depth by 0.020 inches in width. The gate may be angled up from a runner at a 15 degree angle. A maximum gate size may be 0.040 inches by 0.0375 inches. Also, the label may be attached to the interior surface of the mold prior to such injection utilizing an application of water thereto. For example, a fine mist of water may be sprayed on the label prior to it being aligned with any aligning characteristics of the interior surface of the mold thus allowing the label to adhere to such interior surface until the label is held in place by the moldable material as it is injected into the mold, as described above. Preferably, the interior surface of the mold may have a light texture to it when utilizing the fine mist of water for holding the label thereto. This allows an adhesive effect between the water, the label, and the interior surface of the mold cavity. The water use is minimal and only as much as will be evaporated through the heat from the molded material injected into the cavity of the mold. By using such a minimal amount of water, no noticeable marks are evident on the finished part. Alternatively, an electrostatic charge may be applied to the mold to hold the label to the interior surface of the mold or the label may be held in place by a friction fit between the label and a characteristic (e.g., a recess) of the interior surface of the mold prior to the moldable material being injected into the interior of the mold. Further, several such labels may be applied to one or more interior surfaces of a mold prior to injection of the moldable material and the labels may thereby be formed integral to the molded part. Preferably, the label may cover an entire surface of a part to be molded. Thus, the label may cover an entire interior surface of the mold thereby promoting attachment of the label to the mold during the injection process.

Label inserter 50 may be any type of computer controlled robotic arm or mechanism adapted to insert a label into a mold and align it with aligning characteristics of the interior surface of the mold. Label inserter 50 may be coupled to or integral to injection molder 60 and may be controlled by a controller portion of injection molder 60 or a controller portion of label inserter 50, itself. The moldable material may be inserted into the mold under pressure by injection molder 60 or a controller portion of label inserter 50, itself. The pressure of the moldable material on the label may cause the label to conform to the shape of the mold, (e.g., any recessed or projections thereof) and thus the part formed from the mold. For example, the label may be adapted to stretch to conform to the shape of the mold, e.g., the outer perimeter and/or projections or recesses, due to such pressure. Also, the moldable material and the label may be formed integral to each other when the moldable material cools in the mold. Such stretching of the label and the integral forming of label and the moldable material to form the part may be facilitated by the use of a synthetic paper, e.g., TESLIN®. Further, injection molder 60 may be adapted to provide and inject various moldable materials into a mold at various speeds and temperatures. For example, optimal moldable materials include high impact polystyrene, low density polyethylene and various polyolefins. Also, injection molder 60 may be controlled by computing unit 10 and/or it may include a controller therein.

A laminator 90 may also provide a protective covering or lamination to the labels. Such lamination may provide durability, moisture resistance, UV protection, and scratch/scuff resistance. The lamination may be applied after the printing of the label on printer 20 or after the molding of the part and label. Such lamination may allow selection by the user of various finishes which may change the visual appearance of the label and molded part. For example, matte, semi-gloss, and high gloss laminates may be provided. When the lamination is applied after the printing of the label, the lamination may be cut by label cutter 30 simultaneously with the cutting of the label along the die cut line. Laminator 90 may be a standard hot laminator and thus the lamination may be a hot lamination film, as is commonly available in the market place. Also, laminator 90 could be a cold laminator and apply cold lamination film. One example of an acceptable cold lamination film is FLEXON CLASSIC PLUS 1 mil clear matte laminate number 13094. Other acceptable lamination methods include chemical or liquid finish applied to the printed label sheet and dried with ultraviolet or conventional heat sources. However, these latter methods may not provide a wide variety of protective options as is available with a lamination film. The secondary lamination operation (i.e., after the forming of the part integral to the label) may include a hot stamp acrylic finish being applied to the completed part. This operation allows a specific portion of the part to receive the lamination and/or engraving of the part may be done in such a secondary lamination process.

There is a direct correlation between the heat of the injection molding material upon entry into the mold and the ability of the laminate to adhere firmly to the label, e.g., printed TESLIN® material. If the label is too hot, the lamination may blister away from the printed material and create an unacceptable molded part. The heat of the injection material may be controlled through a combination of injection molding parameters that can be adjusted. The melt temperature of the moldable material should be at the lower end of the recommended molding parameters. This is adjusted through the use of heating elements built into the molding machines (e.g., injection molder 60), and also through the proper setting of screw speed and backpressure, as will be understood by those skilled in the art. The amount of cushion should also be kept to a minimum to insure a minimum of gas buildup within the molten plastic material, as will be understood by those skilled in the art. The speed of injection should be on the low side to minimize sheer heat (i.e., heat created by a movement of the moldable material) created through high injection speeds. Any single parameter, or combination of parameters resulting in excessive heat may cause the lamination or the label to blister (i.e., form a bubble) resulting in an unacceptable molded part. Those skilled in the art will understand that the particular temperatures, injection speeds, setting of screw speed, and setting of back pressure may be determined for each individual label-molded part combination. Such parameters may be optimized for such particular combinations to minimize the number of unacceptable molded parts produced. However, such optimized parameters may be unique to each different label-molded part combination.

An example of a part produced utilizing the method and system described above is a golf bag tag 100 depicted in FIG. 2. Golf bag tag 100 is rectangular with an irregular portion 110 in an upper left portion and a raised portion 120 in a center left portion. A label 230 is integral to golf bag tag 100 and thus includes a projecting portion 220 and an irregular portion 235. FIGS. 3–4 depict a molded part portion 150 of golf bag tag 100 without label 230 (FIG. 2). A front view of a mold 200 used to form golf bag tag 100 is depicted in FIG. 5 and a cross-sectional view of mold 200 is depicted in FIG. 6. A recess 210 receives projecting portion 220 (FIG. 2) of a label 230 (FIG. 2), and a molding fluid, for example plastic, may be injected behind label 230, when label 230 is against an interior surface 205 of mold 200. After such molding fluid solidifies, label 230 is attached integrally to the solidified part. It is evident that irregular portion 250 of mold 200 corresponds to irregular portion 110 of golf bag tag 100, irregular portion 235 of label 230 and irregular portion 160 of molded part 150. Thus, in this example, projecting portion 220 of label 230 may be aligned with recess 210 of mold 200 and irregular portion 235 of label 230 may be aligned with irregular portion 250 of mold 200 prior to injecting moldable material into mold 200. Such inserting of label 230 may be performed by a label inserter 50 (FIG. 1) coupled to and controlled by injection molder 60 (FIG. 1). The aligning of label 230 with aligning characteristics such as recesses, irregular shapes, projections, receptacles, tabs, or other distinguishing features of interior surface of a mold promote registration of label 230 with any features formed as a result of such characteristics or features on the interior surface of the mold. Further, such registration is promoted by the utilization of common information among the electronic (e.g. digital) files for the creation of the mold, the label, and the cutting of the label.

Figure 7:
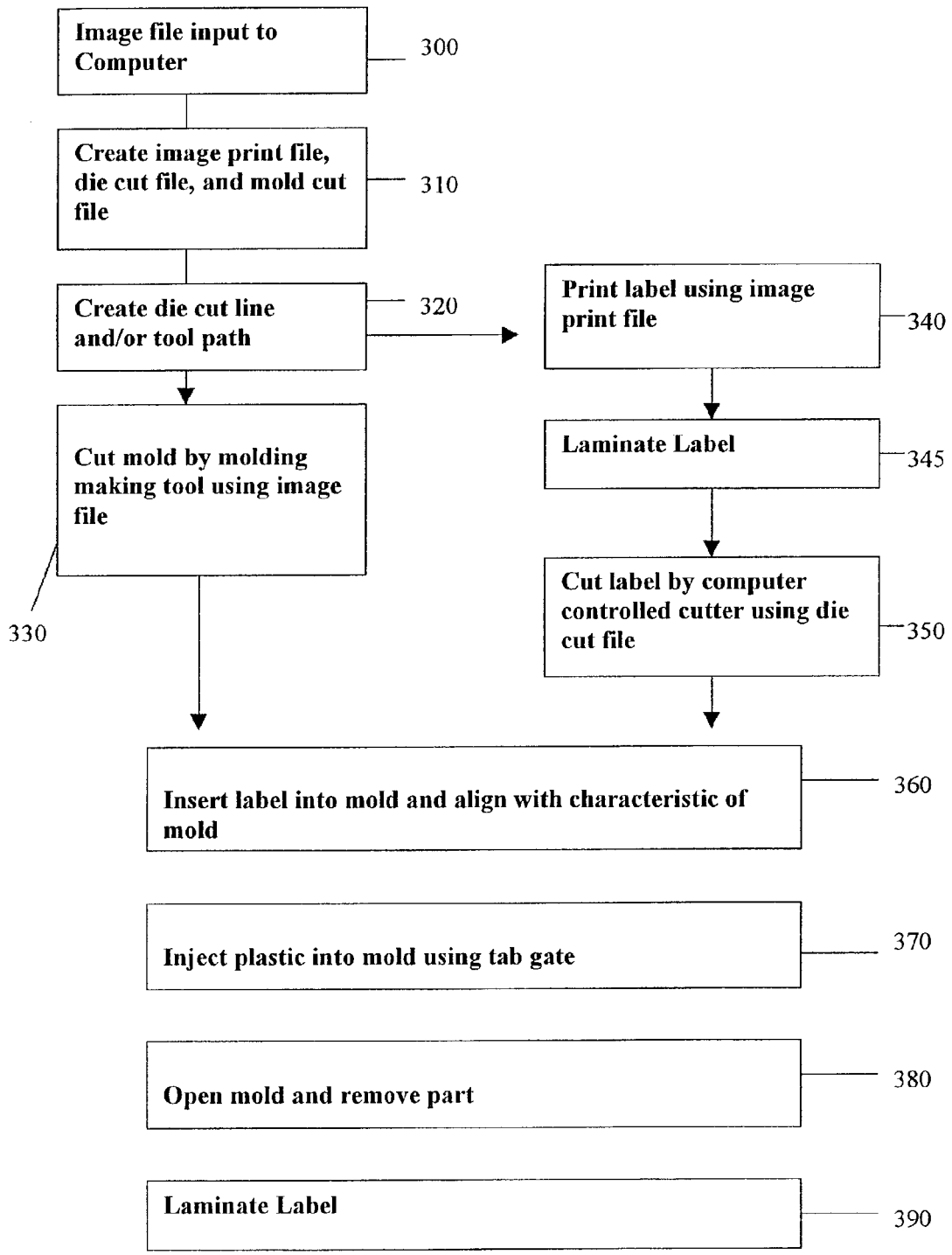
FIG. 7 is a flow chart of a method for creating a molded part having at least one decoration in accordance with the present invention.

FIG. 7 is a flow diagram of an example of a method for forming a part having at least one decoration. Computing unit 10 may receive an image file input by user which is to be converted to a label and applied to a part, at step 300. An image print file, die cut file, and/or mold cut file may be created by computing unit 10 from the image file and any other information provided by a user. Such additional information may include any features desired to be included on interior surface 205 of mold 200, the shape of label 230, desired features of a part to be molded, for example, golf bag tag 100, and/or desired operational features such as temperatures and desired injection speeds of the moldable materials, at step 310. A mold may be cut by mold making tool 40 utilizing the mold cut file (e.g., a tool path), in step 330. A tab gate may also be formed in mold 200 at step 330. Simultaneous with, before, or after step 330, label 230 may be printed on synthetic paper, such as TESLIN®, by printer 20 controlled by computing unit 10, utilizing the image print file at step 340. Label 230 may then be cut by label cutter 30 utilizing the die cut file (e.g., die cut line) at step 350. Label 230 may be inserted into mold 200 manually or by label inserter 50 such that aligning characteristics or features of interior surface 205 of mold 200 are aligned with particular portions of label 230 at step 360. This alignment results in golf bag tag 100 and label 230 being aligned when the molding process is completed. Such aligning by label inserter 50 may also be based on utilizing the mold cut file and/or die cut file, as controlled by computing unit 10 and/or label inserter 50, itself. For example, label 230 may be aligned with mold 200 by aligning irregular portion 235 of label 230 with irregular portion 250 of mold 200 and projecting portion 220 of label 230 with recess 210 of mold 200. This aligning may also include spraying a fine mist of water on label 230 to allow it to be affixed to interior surface 205 of mold 200, for example. Moldable material may be injected into mold 200 through a fan gate thereof which may thus cause the moldable material to flow over label 230 quickly pinning label 230 to interior surface 205 of mold 200, at step 370. After the moldable material has cooled, mold 200 may be opened to allow the part, e.g., golf bag tag 100, to be removed therefrom, at step 380. Label 230 may be laminated by laminator 90 (FIG. 1) before or after the molding process, i.e., at step 345 or at step 390.

Another example of a part produced utilizing the systems and methods described above are illustrated in FIGS. 8–10. FIG. 8 illustrates a golf bag tag 500 having a label attached thereto utilizing the systems and methods described above for golf bag tag 100. FIG. 9 illustrates a topographical view of a molded part 510 of bag tag 500 of FIG. 8 without the label applied thereto. FIG. 10 illustrates a side cross-sectional view of molded part 510 depicted in FIG. 9. FIG. 11 illustrates a label 520 created using the systems and methods described above for label 230. Thus label 520 corresponds to molded part 510 of FIG. 9 which is created using the systems and methods described above for molded part 150. Specifically, an alignment tab 525 is present on label 520 and a corresponding mold part alignment tab 515 is depicted on molded part 510 of FIG. 9. Label 520 may be created utilizing a die cut line 600 (e.g., from a die cut file) illustrated in FIG. 12 which includes the outer perimeter of label 520 including a die cut line tab 605 corresponding to alignment tab 525 (FIG. 11) and molded part alignment tab 515 (FIG. 9). Likewise, a tool path 620 (e.g., from a mold cut file) usable for creating a mold 650 (FIG. 14) is illustrated in FIG. 13 which includes a tool path alignment tab 625 along with a raised portion 630 which creates a golfer image 501 (FIG. 8) at the center of golf bag tag 500. A mold 650 is depicted in FIGS. 14 and 15 with different heights of the mold, and thus part to be created, depicted in various shades. It is evident that golfer image 630 (FIG. 13) is created on molded part 620 and thus golf bag tag 500 via a depression 670 in mold 650. Golfer image 630 thus corresponds to a golfer image 521 on label 520 (FIG. 11) to create golfer image 501 (FIG. 8). Also, it is evident that molded part alignment tab 625 (FIG. 13) is created utilizing a discontinuity 680 (FIG. 14) in an outer perimeter surface of an interior surface 649 of mold 650. Die cut alignment tab 525 (FIG. 11) may be aligned with discontinuity 680 of mold 650 to allow registration between label 520 and molded part 620 through moldable material being inserted into mold 650 while label 520 is attached to interior surface 649. Also, an attachment slot 627 (FIG. 13) is created utilizing a raised portion 690 in mold 650 which allows molding material to form therearound. Further, attaching portion 628 (FIG. 13) surrounding slot 627 is at a different height than face 632 of molded part 620 as depicted in FIG. 13. Specifically, FIG. 14 indicates a different shading for mold attaching portion 688 than a mold face portion 672.

The use of the systems and methods described above allow a user to respond in a short time to customer orders requiring multiple promotional items or other injection molded products. Specifically, the labels and molds are produced from the same information (e.g., digital images) received at a computer which results in molded parts having a high degree of registration between the part and the label formed integral thereto. As will be evident to those skilled in the art, a high registration rate results in a low reject rate thereby increasing the efficiency of the process. Further, the use of digital printing allows a high-quality label to be printed and formed integral to a molded object. The use of direct digital printing on synthetic paper also allows a user to avoid more costly and time consuming processes, such as screen print or offset/lithograph methods, as will be understood by those skilled in the art.

The above-described computing environment regarding the computing unit and system for forming parts having at least one decoration are only offered as examples. The present invention can be incorporated and used with many types of computing units, computers, processors, nodes, systems, work stations, sorters, scanners and/or environments without departing from the spirit of the present invention. For example, mold making tool 40, label cutter 30, and/or injection molder 60 could perform some of the functions of computing unit 10, and/or computing unit 10 could perform some of the functions of mold making tool 40, label cutter 30, and/or injection molder 60. Also, different computing units may control one or more of mold making tool 40, label cutter 30, and/or injection molder 60. Such different computing units may be coupled to each other, as described above, to allow information to be shared between such computing units. For example, a first computing unit might control mold making tool 40 and cause the creation of a mold and a second computing unit may control label cutter 30 to control the cutting of a label, wherein the first computing unit and the second computing may share electronic files to allow an aligning characteristic of the mold to correspond to the label. Such a first computing unit could also be coupled via a computer network to a third server computing unit to allow information to be electronically shared among the several computing units. A fourth computing unit may also be coupled to the third server computing unit via the network to enable such fourth computing unit to tile and print the labels on printer 20 using data retrieved from the third server computing unit. Moreover, each of mold making tool 40, label cutter 30, and/or injection molder 60 may include a controller therein to perform such functions instead of being coupled to a separate computing units.

It will evident from the above description, to one of ordinary skill in the art, that the systems and methods described could be utilized to form any number of molded parts having labels integral thereto. Such parts may be of any of a number of various shapes and sizes and may be for a variety of purposes. Examples of such parts include promotional materials such as name plates, identification tags or plates, light switch plates, security passes, and any other such promotional or novelty items. Also, any other irregularly shaped injection molded product to which it is desired to include decoration or identification could utilize the above described systems and methods to form such products.

Also, it will be understood by those skilled in the art that the electronic files used to print the labels, cut the labels, cut the molds, and/or align the labels and molds could include various types of information in various formats including text and/or image information. Such information could include the outer perimeter shape of an object, the profile of an object, the location of any projections or recesses of an object, the text desired to be printed on the label, the desired colors for the label, the desired thickness of the object, any bevels or other curves on the object, and any other information relating to the creation of the object and/or the label. Accordingly, such information could allow the creation of any number of projections, recesses, distinguishing features, discontinuities or other such aligning characteristics based on such information to allow a label to be aligned therewith. Further, the files described could be combined into a single file utilizable for a variety of purposes, the information in the described files could be allocated differently, or the files could be further divided into more smaller files with different allocations of information.

An alternate method to the use of label cutter 30 to die cut the labels from the printed sheet, as described above, utilizes steel rule dies. Such dies include a plurality of cutting blades aligned to conform to a shape of each label to be cut from a sheet of labels. The steel rule dies are manufactured using the same tiled layout created for the die cutting path used by the label-cutting machine (e.g., label cutter 30). Steel rule die cutting allows the full sheet of decals to be die cut in one operation versus the label machine cutting each label individually out of the sheet of labels.

The embodiments described herein are just examples. There may be many variations to the methods and/or devices described herein without departing from the spirit of the invention. For instance, the operational steps may be performed in a different order, or steps may be added, deleted, or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for use in in-mold labeling to form an irregularly shaped part, the method comprising:
   receiving at least one of text information and image information at a first computing unit;
   forming a mold using a mold cutter controlled by a second computing unit based on the at least one of text information and image information, the mold having a cavity, an interior surface, and at least one aligning characteristic on the interior surface;
   printing a label based on the at the least one of text information and image information for providing the at least one decoration;
   cutting the label from a sheet of paper using a label cutter controlled by a third computing unit based on the at least one of text information and image information;
   inserting the label into the cavity and aligning the label with the at least one aligning characteristic; and
   inserting moldable material into the mold to form the part and the label integral to each other.

2. The method of claim 1 wherein the forming a mold comprises forming the at least one aligning characteristic on the interior surface of the mold based on the at least one of text information and image information.

3. The method of claim 1 wherein the inserting the moldable material comprises injecting the moldable material into the mold through a fan gate in the mold.

4. The method of claim 1 wherein the at least one aligning characteristic comprises a least one of vertical, horizontal, and depth coordinates, and the aligning comprises aligning the label with the at least one of vertical, horizontal, and depth coordinates.

5. The method of claim 1 wherein the at least one aligning characteristic comprises an aligning shape and the aligning comprises aligning the label with the aligning shape.

6. The method of claim 1 wherein the at least one aligning characteristic comprises at least one of a projection and a recess on the interior surface of the mold and the aligning comprises aligning the label to correspond to the shape of the at least one of a projection and a recess and attaching the label to the at least one of a projection and a recess.

7. The method of claim 6 wherein the at least one of a projection and a recess defines at least one of an embossed portion and a recessed portion of the part.

8. The method of claim 1 wherein the at least one aligning characteristic comprises an outer perimeter of at least one of a recess and a projection on the interior surface of the mold.

9. The method of claim 1 wherein the characteristic comprises an outer perimeter of the part.

10. The method of claim 1 wherein the aligning the label further comprises attaching the label to a portion of the interior surface by applying water to at least one of the label and the portion of the interior surface to cause the attaching.

11. The method of claim 1 wherein the aligning the label comprises attaching the label to a portion of the interior surface by applying an electrostatic charge to at least one of the label and the portion of the interior surface to cause the attaching.

12. The method of claim 1 wherein the aligning the label further comprises attaching a label to a portion of the interior surface by frictionally fitting the label to the at least one aligning characteristic to cause the attaching.

13. The method of claim 1 wherein the image information comprises at least one of shape information and profile information relating to at least one of the part and the label.

14. The method of claim 1 wherein the cutting comprises cutting an outer perimeter shape of the label from the sheet of paper.

15. The method of claim 1 wherein the image information comprises a digital image file and the printing the label comprises printing the label on a synthetic paper using a digital printer based on the image information.

16. The method of claim 1 further comprising providing a protective covering to the label.

17. The method of claim 1 wherein the inserting and the aligning comprise inserting and aligning the label using a computer controlled inserting mechanism.

18. The method of claim 1 wherein the first computing unit, the second computing unit, and the third computing unit comprise the same computing unit.

* * * * *